March 12, 1968     J. W. ANDERSON     3,372,423
WINDSHIELD CLEANER
Filed Dec. 13, 1945
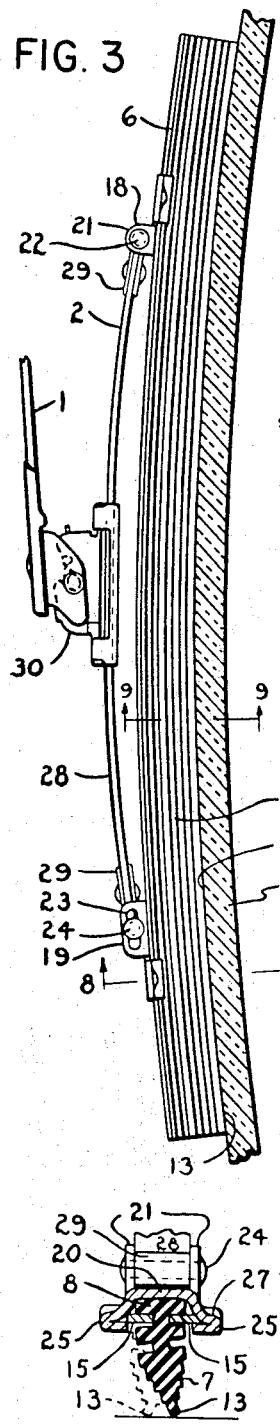
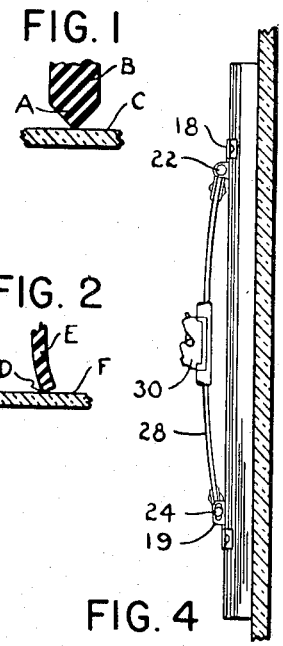
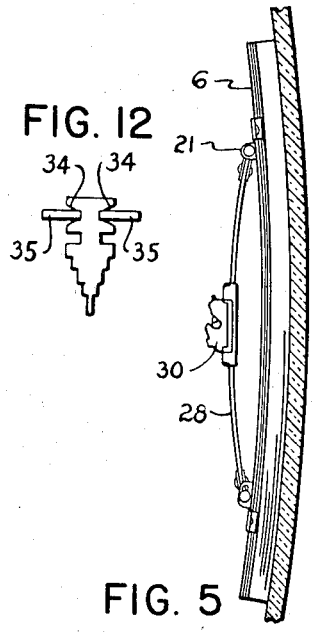
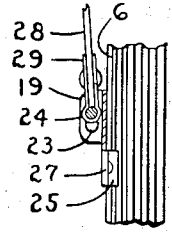
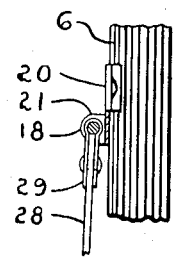
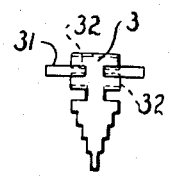
INVENTOR.
JOHN W. ANDERSON
BY
ATTORNEY

United States Patent Office 3,372,423
Patented Mar. 12, 1968

3,372,423
WINDSHIELD CLEANER
John W. Anderson, Gary, Ind., assignor, by mesne assignments, to The Anderson Company, a corporation of Indiana
Filed Dec. 13, 1945, Ser. No. 634,729
19 Claims. (Cl. 15—250.42)

This invention relates generally to windshield or window cleaners or wiper devices and more particularly is directed to a device adapted to clean or wipe a curved surface as well as a substantially planar surface.

During recent years, many engineers, for car manufacturers and for windshield wiper equipment manufacturers, have endeavored diligently to solve the problem of wiping curved windshields satisfactorily. That has been such a serious problem as to have raised in the minds of engineers for car manufacturers a serious question as to the practicability of embodying curved windshields in their vehicles.

Commercial glass such as is used widely, and almost exclusively, in windshields and the like, has irregular surfaces which presents "waves" or "hills" and "valleys." These irregularities are of such significance as to have introduced a rather considerable problem in designing and constructing competent cleaning or squeegee devices such as windshield wiper blades—particularly where the available power for driving the squeegee is limited and where the maximum pressures in applying the squeegee to the glass are relatively light pressures.

The problem is to obtain a conformity of all portions of the wiping edge or edges of the cleaner or wiper, to the glass, with pressures throughout the length of the squeegee varying only within practicable limits.

In cleaning or wiping windshields, a variety of conditions are encountered. For example, a clean driving rain may be cleared for adequate vision through the glass with comparative ease by a light squeegee pressure. However, when heavy road muck is splashed against the windshield, perhaps after the rain has stopped entirely, a different and much more difficult condition is encountered. A light pressure may serve only to smear such muck across the windshield and to substantially blind driving vision. Under such conditions, it is desirable to apply a measure of scraper effect for removing the roughest of the material, followed by a substantial squeegee or wiper effect for cleaning the glass.

It, of course, is understood that frictional resistance varies due to variations in the surface condition of the glass and to varying resistance of extraneous matter. When rainfall or mist is light, the glass tends to become "tacky" in spots, or entirely "tacky," meaning that there is a degree of dryness or wetness which, within a limited range, produces higher than normal friction, either throughout the entire length of the blade or at limited portions of the blade. This condition produces what is commonly called "chatter" of the blade on the glass where certain deficiencies of construction in the wiping mechanism exist. Such "chatter" interferes with cleaning and driving vision.

Maximum flexibility of the cleaning means in reaction to "hills" and "valleys" or deliberate curves in the windshield, promotes that substantially uniform pressure throughout the full length of the wiping edges which is essential to good wiping. However, except for the freedom of that flexibility from substantial frictions in the structure and except for substantial rigidity against variations in lateral resistances and forces, the blade jumps and chatters in its action across the windshield and does not produce a desirable or effective wipe.

Heretofore, it has been found difficult to provide in a wiping element, within practicable limits, the degree of flexibility essential to achieving the intent of progressively applying additional wiping edges as the character of the extraneous matter on the glass becomes more difficult to remove and offers greater resistance to the squeegee.

Since the publication of my Patent No. 1,950,588, dated March 13, 1934, it will be noted from patents issued to various inventors, that the trend of windshield wiper design has borne heavily toward the general construction of the wiping element shown in said patent. This profound influence on windshield wiper design, however, as will be noted by an examination of the art, has not resulted in any construction or arrangement achieving the highly desirable results achieved in the present invention. Some, for example, have introduced means for camming or bending the wiper means to clean a curved surface. This action offers so much, and such irregular resistance to the desired reactions of the wiping element as to render such means ineffective. Others provided constructions which offered no effective resistance to chatter and still others submitted devices substantially inoperative.

The present invention embodies such ideal characteristics as have made it more effective than any previous wiper construction, whether applied to ordinary flat glass or to curved glass embodying simple or compound curves.

The advent of the subject invention has been timely in that it has permitted such engineers to proceed freely to incorporate curved windshields in designs of future models of motor vehicles and to thus improve streamlining and obtain other advantages incidental to the use of correctly engineered windshields.

The primary object of the present invention is to provide a cleaning device embodying improved principles of design and construction which solves the above problems, thereby opening up an undeveloped field of windshield construction and body design for automotive manufacturers which should result in improving the vision and reducing driving hazards of the car owner and in addition streamlining of car bodies for greater efficiency and economy of operation, saving fuel and favorably effecting demands upon our country's petroleum reserves.

Another important object of the invention is to provide a wiper assembly which is adapted for connection to any of the standard arms now in commercial use. In other words, the present invention makes it possible to use a conventional single pivot driving mechanism which projects the blade through a definite arc of a circle. In prior attempts to wipe curved windshields, particularly for aircraft, parallel actions have been employed because they have, to an extent, simplified the problem but only where curves in the windshield are simple as in a lateral section of a cylinder. Such parallel actions, however, introduce additional cost and unsightly structure which tends to obstruct vision and which offers additional opportunities for mechanical failure.

A particular object is to provide a windshield wiper assembly which as comprised of parts few in number and durable in character and which can be economically manufactured and assembled on a production basis.

Other objects and advantages of the invention will become evident after considering the description hereinafter set forth in conjunction with the drawing annexed hereto.

In the drawing:
FIGURES 1 and 2 illustrate two different concepts or principles of design and construction embodied in the windshield cleaner field;
FIGURE 3 is a side view of the wiper device, embodying the invention, applied to the convex surface of a windshield glass;
FIGURES 4 and 5 show the application of the device to planar and concave surfaces, respectively;
FIGURES 6 and 7 illustrate the fastening means and manner in which the extremities of the bridge are pivotally connected to the fastening means;

FIGURE 8 is a transverse section taken substantially on line 8—8 of FIGURE 3;

FIGURE 9 is a transverse section taken substantially on line 9—9 of FIGURE 3;

FIGURE 10 illustrates at least one way the fastening means may be secured to the holder or mounting;

FIGURE 11 illustrates a modified structure to which the invention is susceptible; and FIGURE 12 depicts an additional embodiment of the invention.

The squeegee art is based primarily upon a differentiation of physical characteristics between what is termed a "scraper" and what is termed a true "squeegee."

FIGURE 1 shows a cross-section of a scraper type of resilient element in contact with a windshield or other surface to be wiped. It will be noted that the corner A of scraper B contacts windshield C in such a manner as to permit conformity to the surface of the glass only through the functioning of the inherent resilience of the material itself.

In FIGURE 2, the contacting corner or edge D of wiper or squeegee E against windshield F is under the spring-like flexing pressure of the laterally flexed resilient element, which combined reactions more readily hold the wiping edge in uniform contact with the glass and "flip" the accumulated water away from the blade as the blade turns at the end of its stroke. This "flip" action does not occur with the scraper type as shown in FIGURE 1, and that type therefore drags water back behind the return stroke, and thus obscures vision.

It is desirable to apply a measure of scraper effect for removing the roughest of the material when present, followed by a substantial squeegee effect for cleaning the glass.

This was attempted, and to a substantial degree accomplished, in U.S. Letters Patent 1,950,588 dated March 13, 1934, by the present inventor. It will be noted in FIGURE 3 of that patent that a similar wiping element is shown somewhat lightly contacting the glass while in FIGURE 4 the position of the squeegee element is shown with all of the edges of one side of the squeegee contacting the glass.

It has been found difficult to provide, in the construction shown in that patent, and maintain in the wiping element, within practicable limits, that degree of flexibility essential to achieving the intent of progressively applying additional wiping edges as the character of the extraneous matter on the glass becomes more difficult and offers greater resistance to the squeegee.

Attention is directed to the fact that the final wiping edge 13, shown in FIGURES 8 and 9, presents all of the characteristics of a true squeegee. Its reaction to the glass is through the inherent resistance of the material in the squeegee and to the lateral flexing of the squeegee portion or section 12, which corresponds to the extreme squeegee section 5 in FIGURES 3 and 4 of the patent above mentioned.

It will be noted that the wiping corners of the resilient element shown in FIGURES 3 and 4 of the patent above mentioned present only the characteristics of a scraper, or at least present very little, if any, of the lateral flexing characteristics of a true squeegee. The next lower wiping edge becomes less a scraper and more a true squeegee. The same is true of the next following—and the final edge presents true squeegee characteristics. The same is true of the wiping means in FIGURES 8 and 9 of the present application.

The present invention herein described produces a desirable additional effect of such progressive application and was achieved only after long experience and the exhaustive experimentation and tests which produced the within disclosed satisfactory results. It is obvious that cross-sectional dimensions of the wiper means may be varied to bring such characteristics into maximum play under any varying arm pressures and other conditions.

Attention is directed particularly to the fact that, while presenting maximum and effective flexibility to pressures substantially within a plane at right angles to the windshield, the subject invention presents almost complete rigidity against forces or resistances functioning in a plane substantially parallel to the plane of a windshield. This is accomplished without the introduction of undue friction as would be occasioned by restraining a flexible element against such lateral motion within a rigid channel, as exemplified in Wallace E. Zierer Patent No. 2,254,343, dated September 2, 1941.

Referring to FIGURE 3 of the drawing, numeral 1 designates a conventional wiper arm supporting a wiper assembly generally designated 2 in a manner to distribute the wiper arm pressure applied thereto to press the elongated wiper means 3 against the convex surface 4 of a windshield glass 5. The wiper means 3 is secured to a holder or mounting means 6. The wiper means and the holder 6 are preferably constructed to normally assume a straight condition.

More specifically, the wiper means 3 is constructed of some desirable resilient material, such as rubber, and preferably includes a wiper head 7, which may be generally triangular in cross-section, and an attaching part 8, which may be generally rectangular in cross-section, which head and part are integrally and pivotally or flexibly joined together by a reduced or neck portion 9. Stated otherwise, the sides of the wiper means are interrupted by a pair of oppositely disposed longitudinally extending corresponding recesses 10 to provide pivotally connected parts or portions. The reduced portion 9 permits the wiper head 7 to pivot with respect to the part 8 adjacent the termination of each stroke of the wiper means as it travels back and forth over the windshield glass.

The triangular wiper head 7 is preferably provided with a plurality of wiping edges or arrises 11 and a bendable or flexible lip 12 having wiping edges 13. The wiping edges 13 are adapted to alternately normally engage the glass and certain of the auxiliary wiping edges 11 may also be caused to engage and clean the glass depending on the pressure applied to the wiper means. It is to be understood that the wiping portion may be constructed otherwise than illustrated. For example, the head may be entirely eliminated in which event the neck portion 9 would be of a desirable size and provided with wiping edges corresponding to the edges 13 whereby to accomplish the results comprehended by the invention. Furthermore, the wiper means may be comprised of a plurality of plies or laminations of rubber or the equivalent, which may be bonded or otherwise secured to a flexible holder or backing.

The wiper means and holder means are preferably connected together by an interlocking arrangement. As clearly illustrated, the marginal side walls of the wiper part 8 are interrupted by a pair of oppositely disposed longitudinally extending corresponding openings or grooves 14 which receive a pair of corresponding elongated flexible stay portions or strips 15 constituting the holder means or mounting 6. These strips have a cross-sectional area subject to flexing stresses in use which has a dimension substantially parallel to the surface to be wiped which is greater than its dimension perpendicular to said surface and are preferably constructed from relatively thin resilient sheet metal stock so that they are inherently readily flexible, but may be made from any material suitable for the purpose. In certain applications it may be considered advantageous to construct the holder or mounting means in one flexible piece.

The wiper and the holder may be assembled as desired but the preferred method is to simultaneously insert the strips or stays 15 into the grooves 14 of the part 8, after which the strips or stays 15 are preferably permanently secured together in spaced apart parallel relation by a pair of fastening means 18 and 19 preferably disposed adjacent or near the extremities of the wiper means. Obviously, the assembly may be effected by attaching first one and then the other of the strips to the wiper means. The neck portion 9 together with the reduced intermediate portion between the grooves or interruptions 14 operate in conjunction with each other to promote yieldability or flexibility of the wiper means in general. The portions 16 and 17 on opposite sides of the holder also act in conjunction with the reduced or restricted portions of the wiper means including the portions 16 and 17 to obtain the desired flexation and wiping action. Although not essential, the preferred arrangement permits the strips or stays to substantially simultaneously move in opposite directions in the same plane as the wiper assembly begins or starts each new stroke. This compound flexation has proven to contribute substantially and effectively to the progressive application of additional semi-scraper and scraper edges according to resistance offered by the glass and extraneous matter thereon.

The fastening means 18 and 19, except for one detail, are substantially identical in character and accordingly a description of one is deemed sufficient. The fastening means 18 preferably includes an elongated generally planar base portion 20 which overlies and may bear against the planar top wall of the part 8. One extremity of this base portion 20 is provided with a pair of outstanding parallel standards 21. Each standard is provided with a round aperture. The ends of a pivot pin or pintle 22 project through the apertures. The standards of the fastening means 19 are preferably provided with slots 23 which slidably receive the ends of a pivot pin or pintle 24, whereby to assist in providing compensation for the flexation or yieldability of the holder means and wiper means to accommodate varying degrees of flexure of the blade assembly when the latter rides or travels over a curved or undulated surface. In other words, a lost-motion connection is provided, and which may be applied to one or both of the fastening means 18 and 19. The other extremity of the base portion 20 is preferably provided with a pair of corresponding offset ears or finger portions 25. These ears extend in a direction opposite to that of the standards and are clamped down against, and hence attached to the strips or backing means 15 as clearly illustrated in FIGURE 8.

In order to prevent any possible longitudinal movement or displacement between the strips or stays 15, the exterior marginal edge adjacent the extremity of each strip is preferably provided with an interruption or semi-circular cutout or abutment 26 so that a locking portion or member 27 of each ear may be indented or pressed into the interruption or cutout. Slippage or longitudinal movement of the wiper means and holder with respect to each other is preferably prevented by providing close fits and by causing the base portion 20 to bear lightly against the top surface of part 8 as depicted in FIGURE 8. Counteraction to such movement may also be obtained by providing stops or abutments adjacent the ends of the holder. Obviously, the indentations 27 on one of the fastening means may be entirely eliminated without in any way interfering with the proper operation of the wiper assembly. Moreover, ease and speed of assembly can be promoted by providing a pair of oppositely disposed interruptions adjacent the extremities of each strip, in lieu of the one illustrated.

It is to be understood that any fastening means suitable for the purpose may be employed and that they may be secured to the holder or mounting means in modes different from the one just described. For example, the fastening means and holder may be designed and constructed in a manner whereby they may be secured together by snap-connection means. In those applications which require a relatively long wiper assembly, one or more auxiliary fastening means may be provided intermediate the fastening means 18 and 19 which may or may not be connected with a pressure distributing bridge or link 28.

If found expedient, one of the fastening means may be slidably connected to the holder or mounting means, in lieu of the pin and slot connection to allow the holder and wiper means to flex as intended.

The bridge means or link member 28 provides a connection between the fastening means 18 and 19. The extremities of the bridge are preferably provided with clevises 29, which receive the pivot pins 22 and 24. Conventional means 30 adapted for detachable connection with the conventional arm means 1 is preferably carried by the bridge at its mid-point. The connection between the means 30 and the bridge is preferably of such a character that the wiper means and holder may rock or pivot adjacent the terminations of the strokes of the wiper assembly while in operation. The bridge is preferably bowed and substantially rigid in character, but may take other forms, and, in certain applications or uses, may be caused to flex or yield a limited extent to meet various operating conditions.

As exemplified in FIGURE 11, there is shown a different method by which the holder and cleaner or wiping means are assembled together. In this embodiment the thickness of the strips or stay portions 31 constituting the holder or mounting means is somewhat greater than the width of the oppositely disposed longitudinally extending grooves or interruptions 32 provided in the part 33 of the wiper means. In this arrangement, the grooves or interruptions are forcibly enlarged whereupon the strips are preferably simultaneously inserted into the grooves after which the portions on opposite sides of the part are allowed to return to their normal predetermined positions to engage the opposite sides of the strips.

FIGURE 12 depicts an additional embodiment of the invention, which provides for generally V-shaped longitudinally extending grooves 34 whereby to assist in piloting the strips or portions 35 of the holder into position, and at the same time may assist in promoting the flexibility or vacillation of a portion or portions of the wiper means.

The operation of the cleaner is preferably such that when the wiper means is traveling to the left to clean a surface as depicted in FIGURE 9, the portions of the right and left-hand strips or stay portions 15 of the holder spaced from the fastening means 18 and 19 will be caused to assume outwardly and inwardly disposed positions with respect to the surface, respectively; and when traveling to the right, the wiper head 7 will vacillate or pivot to an opposite angular position assisting to cause the right-hand and left-hand strips or portions to assume opposite positions as indicated by the dotted lines. More specifically, when the wiper means is positioned as depicted in FIGURE 9, the right-hand portion 16 and left-hand portion 17 of the part 8 will be pressed against the lower and upper surfaces of the respective strips or portions and the other portions 16 and 17 of the part may partially become disengaged from the opposite surfaces of the strips, respectively. There will of course be a reversal in the movement of the portions 16 and 17 when the wiper means is traveling in a direction opposite to that just stated.

It is important to note that the provision of the reduced or neck portion 9 connecting the head 7 and part 8 together and the neck portion between the grooves 14 of part 7 improves the resiliency or flexibility of the wiper means in general and consequently results in better vacillation or pivoting of the wiper head to promote and obtain a superior wiping action, not heretofore achieved in prior constructions.

Attention is particularly directed to the fact that one or both of the strips or stay portions 15 of the holder may bend or reversely flex substantially throughout their entire lengths in a plane substantially perpendicular to the surface to be wiped when applied to either of the curved surfaces exemplified in FIGURES 3 and 5, or to combinations of such surfaces. As shown in these figures, substantial operative portions of the resilient wiping element 3 extend longitudinally in either direction from the points at which pressure is applied thereto by the pressure-distributing bridge 28, and these portions can flex or rock thereabout relative to each other in a plane generally perpendicular to the surface to be wiped to facilitate equalization of the pressure of the wiping element 3 against said surface. While the holder is in such a flexed state or condition, the portions may be caused to alternately move outwardly and inwardly with respect to the surface to be cleaned as the wiper assembly is directed back and forth over said surface or surfaces. Otherwise expressed, at least one portion of the holder or mounting means is so constructed and arranged that it has a plurality of ranges of movement in the same general plane, which plane is substantially transverse to the surface to be cleaned. More specifically, the range of movement of portions 15 as illustrated in FIGURE 9 is considerably less than the larger range of movement of the wiper assembly as illustrated in FIGURES 3 and 5. As stated above, the portions 15 are adapted to simultaneously move in opposite directions in a limited plane as the movement of the wiper assembly is reversed and begins or starts each stroke; the larger range of movement being primarily influenced by the curvature or contour of the windshield surface. The wiper assembly, during its operation, is subjected to torsional strains and stresses which may result in causing at least one of the strips or stay portions to slightly tilt or tend to twist and this fact may also contribute to obtain an improved wiping action. In any event, the arrangement is such that the holder or mounting means or the wiper means will function to maintain the full length of the wiping edge of the head in proper wiping contact or engagement with the surface to be cleaned, and such an arrangement requires that the holder means be yieldable, yet sufficiently rigid to obtain the results comprehended by the invention. These factors are important in order that the wiper means may automatically adjust itself to the contour of substantially any windshield surface that might be employed to advantage in the automotive industry.

The combination of effective flexibility of the structure which carries the wiping element, meaning flexibility in one direction, i.e., in a plane generally perpendicular to the surface to be wiped—and of substantial rigidity or inflexibility in the other direction or transverse to the plane of flexure, as above described, makes it possible to provide a satisfactory wiper blade for curved windshields, now coming widely into potential use—and at the same time directly increases the effectiveness of the wiper on a normally flat windshield.

In view of the foregoing description, it will be evident that the preferred form of the invention includes improved wiper means and holder or mounting means which are associated or connected together in a manner whereby they may flex or yield while traveling over and cleaning or wiping a concave or convex surface as illustrated in FIGURES 3 and 5 of the drawing, or combinations of such surfaces, as well as for superior wiping operation against a substantially planar surface as illustrated in FIGURE 4.

It will also be apparent that means have been provided whereby to improve or promote the resiliency or yieldability of the wiper means whereby to obtain a superior wiping action.

Moreover, it will be evident that improved means have been provided for connecting a holder or mounting means with respect to bridge means whereby to assist in compensating for the flexation or yieldability of the mounting means and the wiper means.

Furthermore, the present invention provides a wiper assembly having a relatively narrow width as compared to many known devices in the art. This narrowness offers a minimum of obstruction to vision.

Having thus described my invention, it is obvious that various modifications may be made in the same without departing from the spirit of the invention; and, therefore, I do not wish to be undestood as limiting myself to the exact forms, constructions, arrangements, and combinations of parts herein shown and described.

I claim:

1. A windshield wiper blade, comprising: an elongated resilient wiping element having a wiping edge, said wiping element having a pair of longitudinally extending grooves spaced from said wiping edge; elongated longitudinally flexible, planar strips disposed in said grooves; and means embracing and retaining said strips in said grooves.

2. A windshield wiper blade as defined in claim 1, in which the retaining means comprises fastening elements having an interlocking connection with the planar strips.

3. A windshield wiper blade, comprising: an elongated resilient wiping element having a wiping edge, said wiping element having longitudinally extending grooves in the opposite sides thereof spaced from said wiping edge; and an elongated planar strip disposed in each of said grooves, said planar strips having a width greater than the depth of said grooves so that portions thereof are exposed laterally and outwardly of the sides of said wiping element.

4. A windshield wiper as defined in claim 3, including longitudinally spaced fastening elements connecting said strips together and securing the same to the wiping element.

5. In a windshield wiper assembly, a readily bendable elongated wiping element of resilient material; readily reversely resiliently flexible elongated stay means engaging and supporting said wiping element and having portions disposed laterally outwardly of said wiping element, said stay means being freely flexible in a plane perpendicular to the windshield and being substantially inflexible in a plane disposed at right angles to said first-mentioned plane; two spaced-apart attaching means each connected to said last-mentioned portions of said stay means at points disposed a substantial distance from an extremity of said stay means, whereby substantial contiguous portions of said stay means and of said wiping element extend in opposite directions from the respective attaching means and are adapted to be urged toward a windshield; elongated bridge means connected to said attaching means; and means carried by said bridge means for attaching it to a windshield wiper arm for applying pressure to said wiping element.

6. A windshield wiper blade comprising, an elongated resilient wiping element having a wiping edge; flexible, substantially flat, ribbon-like stay means including longitudinally extending portions spaced from said wiping edge and projecting laterally from the sides of said wiping element, said laterally projecting portions of the stay means being provided with longitudinally spaced attaching means for connecting the same to a pressure distributing device.

7. A windshield wiper comprising, a blade having an elongated resilient wiping member capable of conforming to a surface to be wiped and having elongated support means coactive therewith, said support means being easily and substantially uniformly flexible in a single plane, yoke means extending longitudinally of said resilient wiping member and coactive therewith, said support means being easily and substantially uniformly flexible in a single plane, yoke means having end portions bearing upon said blade at longitudinally spaced points substantially inwardly of the ends thereof, the portions of said yoke means between said end portions being spaced from said blade.

8. A wiper as defined in claim 7 wherein said yoke means comprises a single yoke member.

9. A windshield wiper comprising, a blade having an elongated linearly continuous resilient wiping member capable of conforming to a surface to be wiped, elongated support means extending longitudinally and at least in part externally of said wiping member and secured to said member, said support means being flexible in a single plane, and an elongated pressure-applying yoke member extending longitudinally of said blade having end portions, laterally offset from its longitudinal dimension and in a direction toward the surface to be wiped, said end portions being connected to said blade at spaced points substantial distances inwardly of the ends thereof.

10. In a surface cleaning device, a blade having an elongated flexible resilient wiping member capable of conforming to a surface to be cleaned, elongated support means extending longitudinally of said wiping member, said support means being easily flexible in a single plane only, said support means having external portions projecting outwardly from opposite sides of said wiping member, and means secured to said projecting external portions and engaging said wiping member to hold said wiping member in assembled relation to said support means.

11. A windshield wiper comprising, a blade having an elongated resilient wiping member capable of flexure to conform to a surface to be wiped, elongated support means extending longitudinally of said wiping member and secured to said member, said support means being easily and substantially uniformly flexible in a single plane whereby to confine longitudinal flexure of said blade to said single plane, and a plurality of longitudinally spaced elements secured to said blade substantial distances inwardly of the ends of said blade and adapted to have pressure-applying means attached thereto.

12. In a windshield wiper blade assembly a readily bendable elongated wiping element of resilient material having a wiping edge, and elongated substantially uniformly and freely flexible stay means supporting said wiping element, said wiping element having a first longitudinal portion spaced away from said wiping edge and having a lesser lateral dimension than a second longitudinal portion thereof, said second portion being normally disposed a greater distance from said wiping edge than said first portion, and overhanging longitudinal surfaces carried by said second portion, said stay means having portions engaging said overhanging surfaces.

13. A windshield wiper device comprising a wiper unit, said unit including an elongated resilient flexible body having a back portion and a wiping edge conformable to a surface to be wiped, a pair of transversely aligned grooves formed in the body extending substantially throughout the length thereof and positioned between said back portion and said wiping edge, elongated backing means flexible in a plane substantially perpendicular to the surface to be wiped and substantially inflexible in a plane at right angles to said first mentioned plane, said backing means having a pair of uninterrupted longitudinally extending edges positioned in said pair of transversely aligned grooves, longitudinally spaced apart clamp means connected to said unit, and means for applying pressure to said clamp means to cause the wiping edge of the flexible body to conform to the surface being wiped.

14. A windshield wiper device, comprising a wiper unit, said unit including an elongated resilient flexible body having a back portion and a wiping edge conformable to a surface to be wiped, a plurality of transversely aligned indentations formed in the body extending substantially throughout the length thereof and positioned between said back portion and said wiping edge, elongated backing means flexible in a plane substantially perpendicular to the surface to be wiped and substantially inflexible in a plane at right angles to said first mentioned plane, said backing means having a pair of longitudinally extending portions, said portions having edges positioned in said transversely aligned indentations, longitudinally spaced apart attachment means connected to said unit, and means for applying pressure to said attachment means to cause the wiping edge of the flexible body to conform to the surface being wiped.

15. A windshield wiper device, comprising a wiper unit, said unit including an elongated resilient flexible body having a back portion and a wiping edge conformable to a surface to be wiped, a plurality of transversely aligned indentations formed in the body on opposite outer sides thereof and extending substantially throughout the length thereof and positioned between said back portion and said wiping edge, elongated backing means flexible in a plane substantially perpendicular to the surface to be wiped and substantially inflexible in a plane at right angles to said first mentioned plane, said backing means having a pair of longitudinally extending portions, said portions having edges positioned in said transversely aligned indentations, longitudinally spaced apart attachment means connected to said unit, and means for applying pressure to said attachment means to cause the wiping edge of the flexible body to conform to the surface being wiped.

16. A windshield wiper device, comprising a wiper unit, said unit including an elongated resilient flexible body having a back portion and a wiping edge conformable to a surface to be wiped, a pair of transversely aligned grooves formed in the body extending substantially throughout the length thereof and positioned between said back portion and said wiping edge, elongated backing means flexible in a plane substantially perpendicular to the surface to be wiped and substantially inflexible in a plane at right angles to said first mentioned plane, said backing means having a pair of longitudinally extending edges positioned in said pair of transversely aligned grooves, longitudinally spaced apart attachment means connected to said unit, and means for applying pressure to said attachment means to cause the wiping edge of the flexible body to conform to the surface being wiped.

17. A windshield wiper device, comprising a wiper unit, said unit including an elongated resilient flexible body having a back portion and a wiping edge conformable to a surface to be wiped, said body having a formed portion thereon extending substantially throughout the length thereof and positioned between said back portion and said wiping edge, and elongated backing means flexible in a plane substantially perpendicular to the surface to be wiped and substantially inflexible in a plane at right angles to said first mentioned plane, said backing means having means interconnecting with said body formed portion, longitudinally spaced apart attachment means connected to said unit, and means for applying pressure to said attachment means to cause the wiping edge of the flexible body to conform to the surface being wiped.

18. A windshield wiper device, comprising a wiper unit, said unit including an elongated resilient flexible body having a back portion and a wiping edge conformable to a surface to be wiped, a pair of transversely aligned grooves formed in the body extending substantially throughout the length thereof and positioned between said back portion and said wiping edge, elongated backing means flexible in a plane substantially perpendicular to the surface to be wiped and substantially inflexible in a plane at right angles to said first mentioned plane, said backing means having a pair of uninterrupted longitudinally extending edges positioned in said pair of transversely aligned grooves, longitudinally spaced apart clamp means connected to said unit, and means for applying pressure to said clamp means to cause the wiping edge of the flexible body to conform to the surface being wiped, said last named means comprising a yoke member extending longitudinally of said wiper unit and interconnected at its opposite ends to said clamp means, at least one end of said yoke member being longitudinally slidable relative to said wiper unit.

19. A windshield wiper device, comprising a wiper unit, said unit including an elongated resilient flexible body having a back portion and a wiping edge conformable to a surface to be wiped, a plurality of transversely aligned indentations formed in the body extending substantially throughout the length thereof and positioned between said back portion and said wiping edge, elongated backing means flexible in a plane substantially perpendicular to the surface to be wiped and substantially inflexible in a plane at right angles to said first mentioned plane, said backing means having a pair of longitudinally extending edges positioned in said transversely aligned indentations, longitudinally spaced apart attachment means connected to said unit, and means for applying pressure to said attachment means to cause the wiping edge of the flexible body to conform to the surface being wiped, said last named means comprising a yoke member extending longitudinally of said wiper unit and interconnected at its opposite ends to said attachment means, at least one end of said yoke member being longitudinally slidable relative to said wiper unit.

References Cited

UNITED STATES PATENTS

| | | | |
|---|---|---|---|
| 948,630 | 2/1910 | Lane | 15—245 |
| 1,706,053 | 3/1929 | Bussinger | 15—245 |
| 2,039,716 | 5/1936 | Horton | 15—245 |
| 2,276,556 | 3/1942 | Zaiger | 15—250.7 |
| 2,149,037 | 2/1939 | Zaiger | 15—250.7 |
| 2,254,343 | 9/1941 | Zierer | 15—255 |
| 1,498,155 | 6/1924 | Dorr | 15—245 |
| 1,706,053 | 3/1929 | Bussinger | 15—245 |
| 1,950,588 | 3/1934 | Anderson | 15—245 |
| 2,265,551 | 12/1941 | Steccone | 15—245 |
| 2,376,098 | 5/1945 | Steccone | 15—245 |
| 1,971,893 | 8/1934 | Anderson | 15—250 |
| 2,147,113 | 2/1939 | Smulski | 15—250 |
| 2,252,510 | 8/1941 | Horton | 15—250 |
| 1,510,509 | 10/1924 | Stadeker | 15—255 |

FOREIGN PATENTS

| | | |
|---|---|---|
| 427,383 | 4/1935 | Great Britain. |
| 433,467 | 8/1935 | Great Britain. |
| 707,722 | 4/1931 | France. |
| 820,156 | 7/1937 | France. |

CHARLES A. WILLMUTH, *Primary Examiner.*

SIDNEY JAMES, EXCELLENZA MORSE, *Examiners.*

E. JAMES SAX, JAMES C. HUNDLEY,
*Assistant Examiners.*

UNITED STATES PATENT OFFICE
CERTIFICATE OF CORRECTION

Patent No. 3,372,423                          March 12, 1968

John W. Anderson

It is certified that error appears in the above identified patent and that said Letters Patent are hereby corrected as shown below:

Column 8, line 61, after "means", first occurrence, insert -- extending longitudinally of said resilient wiping member and --.

Signed and sealed this 9th day of September 1969.

(SEAL)
Attest:

Edward M. Fletcher, Jr.                     WILLIAM E. SCHUYLER, JR.
Attesting Officer                                Commissioner of Patents